(12) United States Patent
Takeda

(10) Patent No.: US 6,725,143 B2
(45) Date of Patent: Apr. 20, 2004

(54) METHOD AND APPARATUS FOR CONTROLLING A BICYCLE TRANSMISSION

(75) Inventor: Kazuhiro Takeda, Sakai (JP)

(73) Assignee: Shimano, Inc., Sakai (JP)

(*) Notice: Subject to any disclaimer, the term of this patent is extended or adjusted under 35 U.S.C. 154(b) by 0 days.

(21) Appl. No.: 10/267,494

(22) Filed: Oct. 8, 2002

(65) Prior Publication Data
US 2003/0078716 A1 Apr. 24, 2003

(30) Foreign Application Priority Data
Oct. 22, 2001 (JP) .................... 2001-323972

(51) Int. Cl.[7] .............. G06F 17/00; F16H 3/44
(52) U.S. Cl. .......................................... 701/51
(58) Field of Search .............. 701/51, 64; 475/294, 475/297, 298; 474/70, 80, 82, 101, 102–106, 109, 116; 280/238; 180/337, 366

(56) References Cited

U.S. PATENT DOCUMENTS

| | | | |
|---|---|---|---|
| 4,490,127 A | | 12/1984 | Matsumoto et al. |
| 4,952,196 A | * | 8/1990 | Chilcote et al. ............... 474/70 |
| 5,059,158 A | | 10/1991 | Bellio et al. |
| 5,967,937 A | * | 10/1999 | Matsuo ...................... 475/297 |

* cited by examiner

*Primary Examiner*—Thu V. Nguyen
(74) *Attorney, Agent, or Firm*—James A. Deland

(57) ABSTRACT

An apparatus for controlling the operation of a bicycle transmission includes a shift command receiving unit that receives shift command signals corresponding to shift commands, and a shift command combining unit that combines a plurality of the shift command signals into a resultant shift command signal that would shift the bicycle transmission to the same state as if the plurality of shift commands all were executed individually. A method for controlling the operation of a bicycle transmission includes the steps of receiving shift command signals corresponding to shift commands, and combining a plurality of the shift command signals into a resultant shift command signal that would shift the bicycle transmission to the same state as if the plurality of shift commands all were executed individually.

20 Claims, 6 Drawing Sheets

METHOD AND APPARATUS FOR CONTROLLING A BICYCLE TRANSMISSION

BACKGROUND OF THE INVENTION

The present invention is directed to bicycles and, more particularly, to various features of a method and apparatus for controlling a bicycle transmission.

Bicycle transmissions that are operated by an electric motor or the like have recently become known. Such transmissions may be shifted automatically according to the bicycle speed shifted manually by the rider. Typically, a shift command is generated according to the bicycle speed or manual input by the rider, the motor is controlled by a transmission operating unit in response to the shift command, and the speed step of the transmission is set accordingly.

Shift commands sometimes are generated while the transmission is being operated. When prior art systems receive shift commands at this time, either the shift commands are ignored, or else the shift commands are saved and executed sequentially when the transmission operation is complete. If shift commands are ignored in the case of manual shifting, then the rider's intentions are not carried out. Furthermore, in such a system the rider must personally keep track of when shifting operations begin and end, which is very undesirable for a supposedly automated system. On the other hand, when the shift commands are saved and executed sequentially when the transmission operation is complete, there is a risk of wasted effort. More specifically, sometimes the rider enters a series of upshift and downshift commands, either because of changing conditions or because of initial misjudgment of the desired gear. If, for example, the rider wanted to enter a single upshift command but mistakenly entered two upshift commands and then entered a downshift command to correct the error, then in prior art systems the transmission would make a total of three shifts instead of one. Such a mode of operation creates unnecessary wear on the components, it requires more time to execute all of the shift commands, and it unnecessarily drains the power supply.

SUMMARY OF THE INVENTION

The present invention is directed to various features of a method and apparatus for controlling a bicycle transmission. In one embodiment of the present invention, a shift command receiving unit is provided that receives shift command signals corresponding to shift commands, and a shift command combining unit is provided that combines a plurality of the shift command signals into a resultant shift command signal that would shift the bicycle transmission to the same state as if the plurality of shift commands all were executed individually. A method according to the present invention includes the steps of receiving shift command signals corresponding to shift commands, and combining a plurality of the shift command signals into a resultant shift command signal that would shift the bicycle transmission to the same state as if the plurality of shift commands all were executed individually. Additional inventive features will become apparent from the description below, and such features may be combined with the above features to provide additional benefits.

DETAILED DESCRIPTION OF THE EMBODIMENTS

Figure 1:
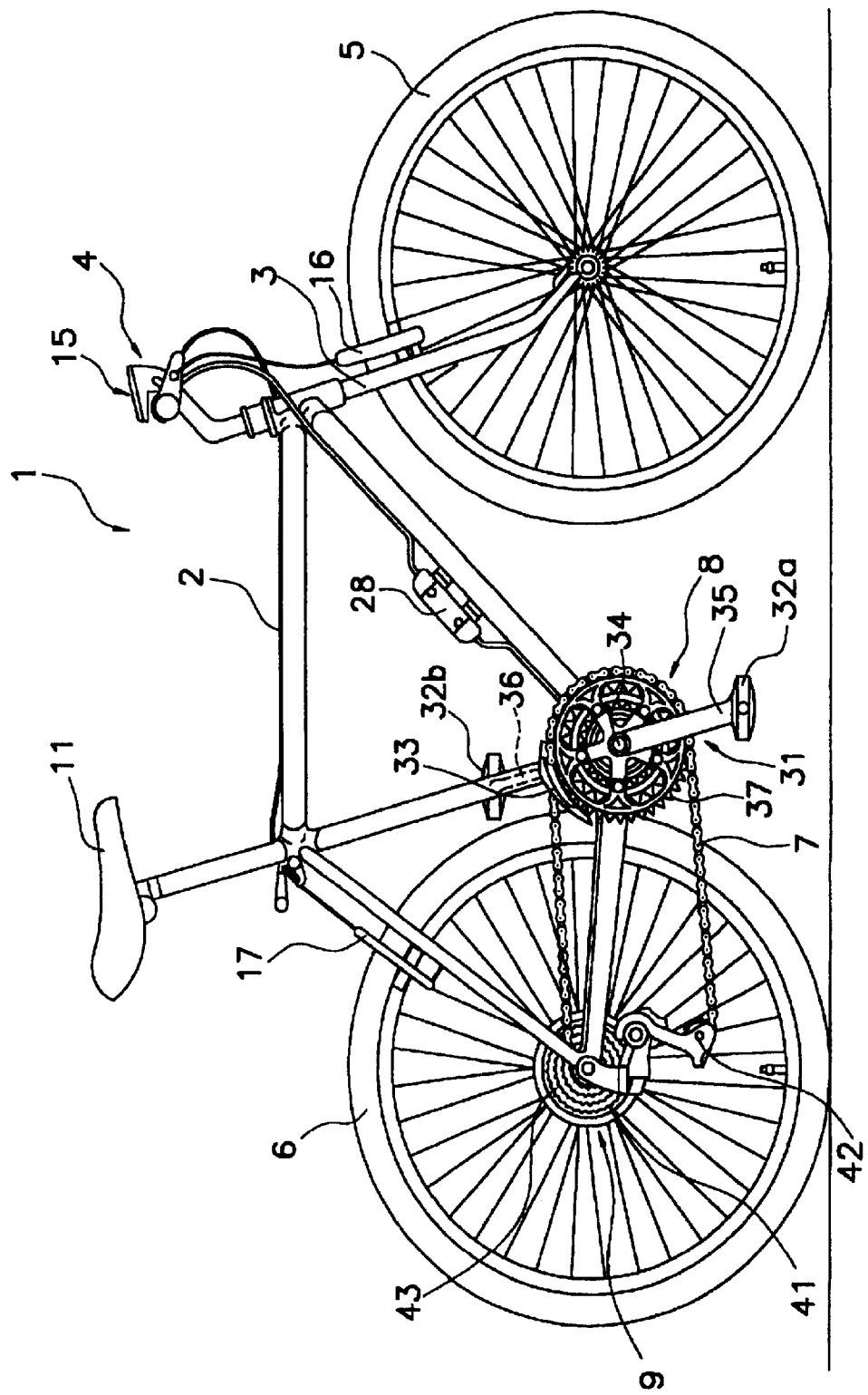
FIG. 1 is a side view of a bicycle that includes particular embodiments of electrically controlled bicycle transmissions.
Figure 2:
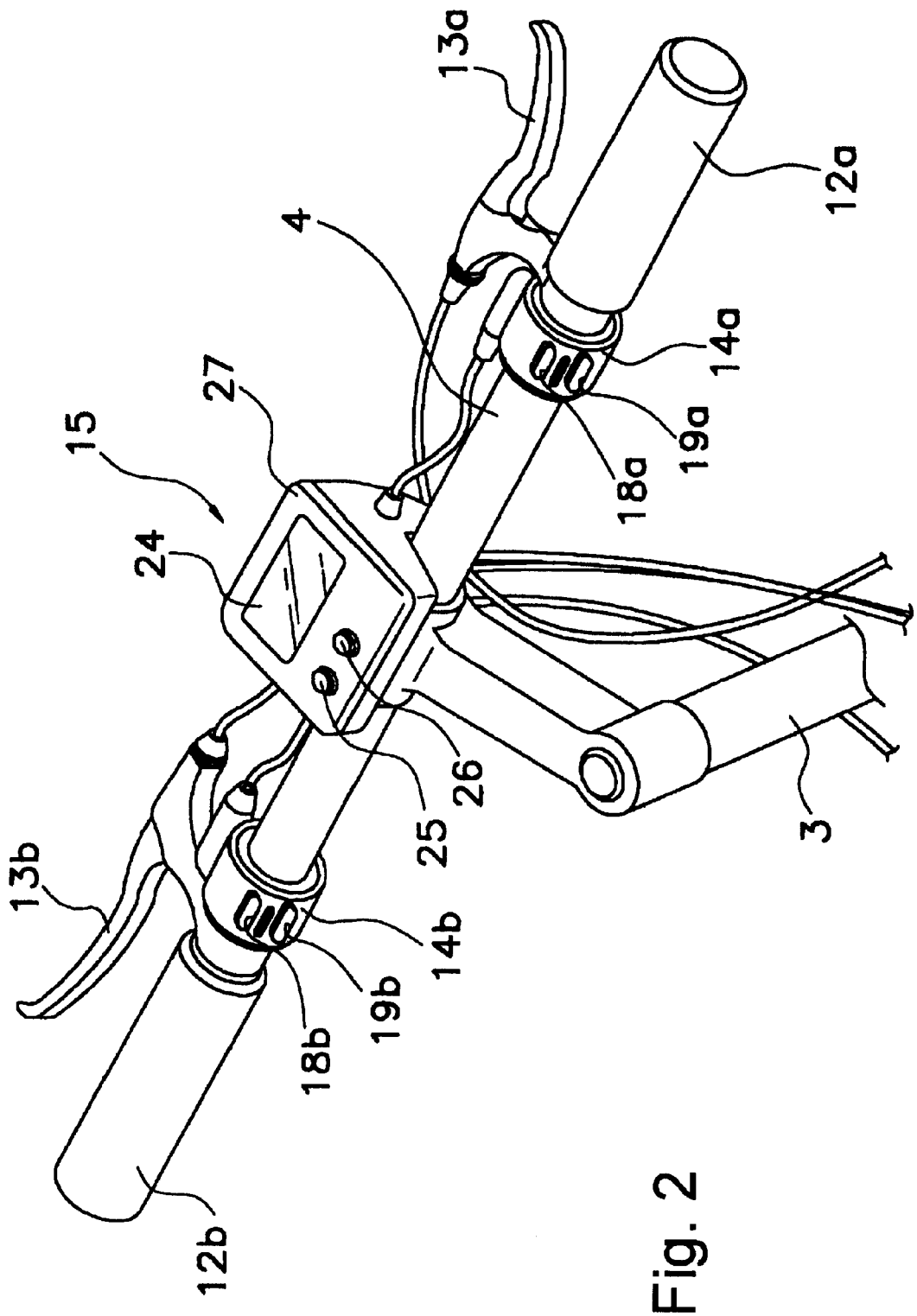
FIG. 2 is a detailed view of particular embodiments of handlebar mounted components of the bicycle shown in FIG. 1.

FIG. 1 is a side view of a bicycle that includes particular embodiments of electrically controlled bicycle transmissions. The bicycle 1 is a sport bicycle of a mountain bike type, and it comprises a frame 2, a front fork 3 rotatably mounted to frame 2, a handlebar assembly 4 mounted to the upper part of fork 3, a front wheel 5 rotatably attached to the lower part of fork 3, a rear wheel 6 rotatably attached to the rear of frame 2, a chain 7, a front transmission 8, a rear transmission 9, and a saddle 11. A front wheel brake 16 is provided for braking the front wheel 5, and a rear wheel brake 17 is provided for braking the rear wheel 6. As shown in FIG. 2, respective grips 12a, 12b and brake levers 13a, 13b are provided on both ends of handle 4. Brake lever 13b is connected to the front wheel brake 16 for braking front wheel 5, and brake lever 13a is connected to the rear wheel brake 17 for braking rear wheel 6.

The front transmission 8 is a mechanical unit attached in the central lower part of frame 2 for transmitting the drive force generated by the rider to the rear transmission 9 via the chain 7. The front transmission 8 comprises three sprockets 37 of various sizes and a front derailleur 33. The three sprockets 37 are installed on a gear crank 31 that is rotated when the rider pushes pedals 32a and 32b. The gear crank 31 comprises a crankshaft 34 that passes horizontally and rotatably through the central lower part of frame 2, a right crank 35, and a left crank 36. One end of the right crank 35 is connected to the right side of crankshaft 34, and the three sprockets 37 are attached to the right crank 35. One end of the left crank 36 is connected to the left side of crankshaft 34. The other ends of right crank 35 and left crank 36 rotatably support pedals 32a and 32b, respectively. The front derailleur 33 engages the chain 7 with one of the three sprockets 37 and can be moved by a motor (not shown in the figures) that is controlled by a transmission control unit 15 described below. A front derailleur position sensor (not shown in the figures) detects the position of front derailleur 33 and hence the current speed step of front transmission 8.

The rear transmission 9 serves to transmit the driving force transmitted by the chain 7 to the rear wheel 6. The rear transmission 9 comprises a rear sprocket wheel 41 and a rear derailleur 42. In this embodiment, rear sprocket wheel 41 comprises seven sprockets 43 of different sizes that are mounted concentrically with the hub portion of rear wheel 6. Rear derailleur 42 engages chain 7 with one of the seven sprockets 43 and can be moved by a motor (not shown in the figures) that is controlled by transmission control unit 15. A rear derailleur position sensor (not shown in the figures) detects the position of rear derailleur 42 and hence the current speed step of rear transmission 9.

As shown in FIG. 2, shift command units 14a, 14b are provided inwardly of grips 12a, 12b and brake levers 13a, 13b, respectively. Transmission control unit 15 is attached to the central portion of handlebar assembly 4, and it is connected to the shift command units 14a, 14b. The shift command units 14a, 14b are used for shifting the front transmission 8 and rear transmission 9. A rear upshift button 18a and a rear downshift button 19a are provided in the shift command unit 14a, and a front upshift button 18b and a front downshift button 19b are provided in the shift command unit 14b. In this embodiment, the upshift buttons 18a and 18b provide signals for upshifting the front and rear transmissions 8 and 9 by one speed step. Similarly, the downshift buttons 19a and 19b provide signals for downshifting the front and rear transmissions 8 and 9 by one speed step.

Figure 3:
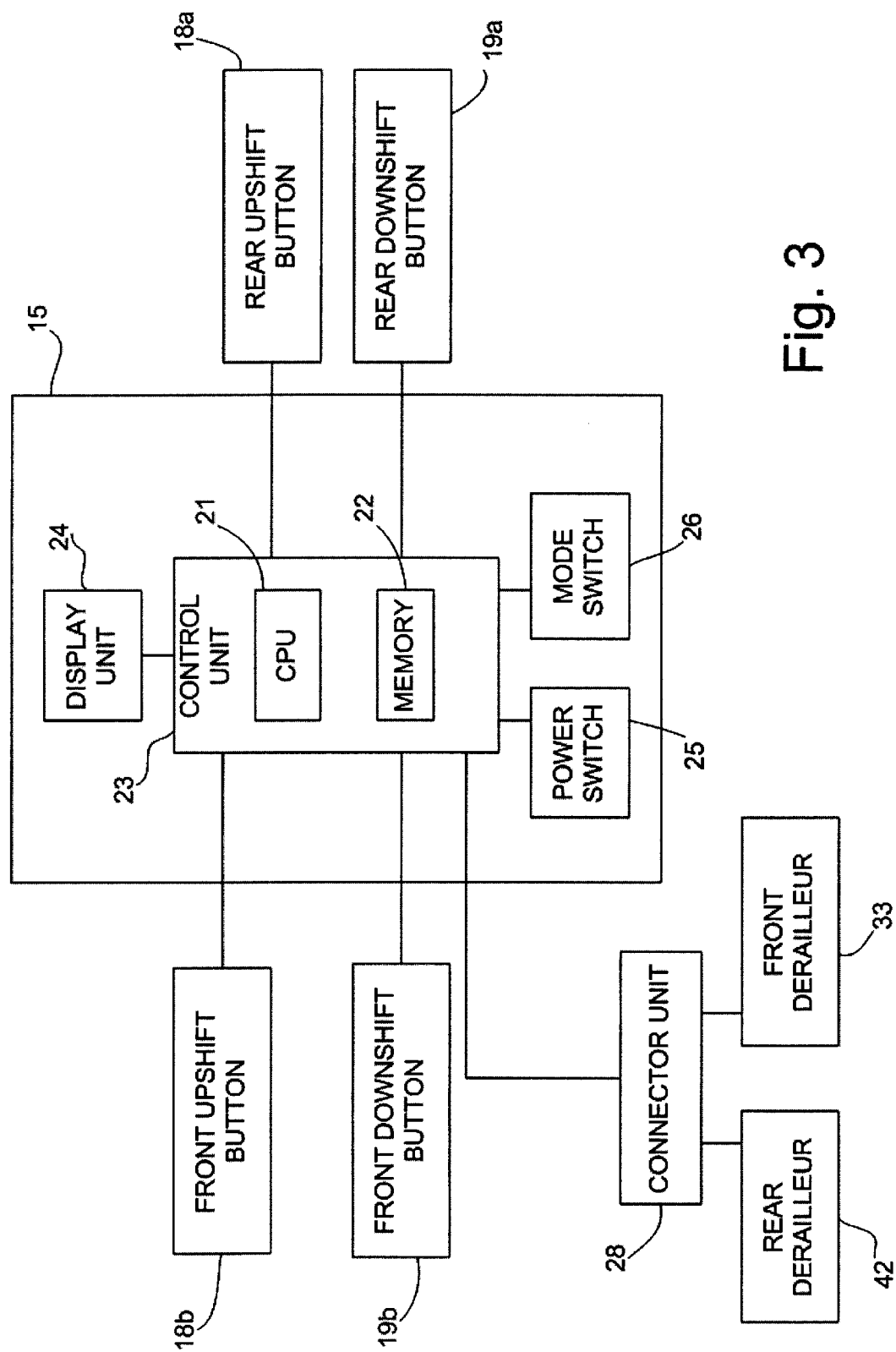
FIG. 3 is a block diagram of a particular embodiment of a control unit.

The transmission control unit 15 controls the front transmission 8 and rear transmission 9 according to the signals provided by the shift command units 14a and 14b. As shown in FIG. 3, the transmission control unit 15, comprises a control unit 23 having a CPU 21 and memory 22, a display unit 24 for displaying the current speed step, a power switch 25, and a mode switch 26. The control unit 23 controls the transmission control unit 15 with the CPU 21 according to the information stored in the memory 22. The mode switch 26 changes an operating mode of transmission control unit 15. As shown in FIG. 2, the transmission control unit 15 includes a box-like housing 27. The display unit 24, the power switch 25, and the mode switch 26 are arranged on the upper surface of housing 27. The transmission control unit 15 is connected to the front transmission 8 and to the rear transmission 9 by a connector unit 28.

Figure 4:
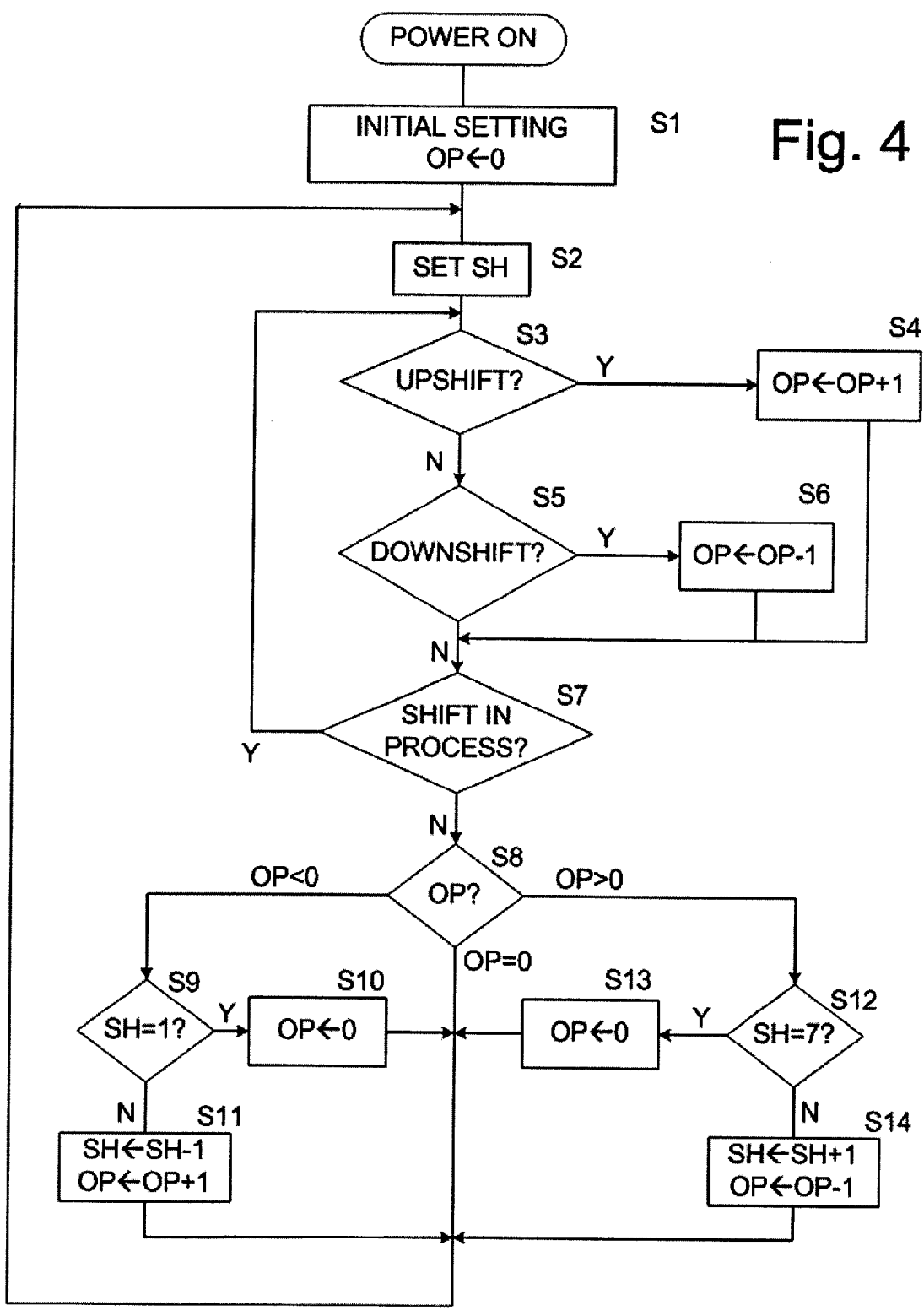
FIG. 4 is a flow chart of a particular embodiment of an algorithm used to control the rear transmission.

FIG. 4 is a flow chart of a particular embodiment of an algorithm used to control the rear transmission 9. The algorithm used to control the front transmission 8 is the same, except the number of speed steps is less, so the explanation thereof is omitted. The algorithm is invoked when the rider turns on the power switch 25 of transmission control unit 15.

Initial setting of transmission control unit 15 is conducted in step S1. This initial setting includes the initialization of a count value location (OP) in the memory 22 to zero. The OP value is incremented or decremented according to the operation of shift command unit 14a. In step S2, the current position of rear derailleur 42 is obtained from the position sensor for rear derailleur 42 and stored in a location (SH) in memory 22. For example, SH is set to three when the rear transmission 9 is in the third speed step position.

In step S3, a decision is made whether or not the rear upshift button 18a of shift command unit 14a has been pushed. If so, the program proceeds to step S4 wherein the value of OP is incremented by one, and the program proceeds to step S7. If the rear upshift button 18a has not been pushed, then the value of OP remains the same, and the program proceeds to step S5. In step S5, a decision is made whether or not the rear downshift button 19a of gear change operation unit 14a has been pushed. If so, the program proceeds to step S6 wherein the value of OP is decremented by one, and then the program proceeds to step S7. If the rear downshift button 19a has not been pushed, then the value of OP remains the same, and the program proceeds to step S7. In step S7, a decision is made by the derailleur position sensor or the like whether or not the rear derailleur 42 is being shifted. If rear derailleur 42 is presently being shifted, the program returns to step S3. The value of OP again will be incremented or decremented depending upon the activity of rear upshift button 18a and rear downshift button 19a in the manner noted above. This series of steps continue as long as rear derailleur 42 is being shifted.

If it is determined in Step S7 that rear derailleur 42 is not being shifted (e.g., the rear derailleur 42 has completed a prior shifting operation), the program proceeds to step S8. In step S8, a decision is made whether or not the OP value resulting from the combined operations of rear upshift button 18a and/or rear downshift button 19a during shifting of the rear derailleur 42 (Steps S3–S7) is positive, negative, or zero. As discussed below, derailleur 42 is further adjusted, if necessary, according to this determination.

When OP equals zero, either no further shift commands were issued during the operation of rear derailleur 42, or else rear upshift button 18a and rear downshift button 19a were operated in a manner to cancel each other out. In either case, the program returns to step S2.

A negative OP value indicates that the rider wants a net downshift by some amount. In this case, the program proceeds to step S9, and it is determined whether or not the current speed step (SH) for rear derailleur 42 equals one. A current speed step of one indicates that the chain 7 already is engaged with the sprocket 43 corresponding to the lowest speed step, and chain 7 cannot be shifted further. Accordingly, no further adjustment of derailleur 42 is performed, OP is reset to zero in Step S10, and the program returns to step S2. On the other hand, when SH is not equal to one, rear derailleur 42 is operated to shift chain 7 to the sprocket 43 corresponding to the next lower speed step, the value of SH is decremented by one, the value of OP is incremented by one, and the process returns to step S2.

A positive OP value indicates that the rider wants a net upshift by some amount. In this case, the program proceeds to step S12, and it is determined whether or not the current speed step (SH) for rear derailleur 42 equals seven. A current speed step of seven indicates that the chain 7 already is engaged with the sprocket 43 corresponding to the highest speed step, and chain 7 cannot be shifted further. Accordingly, no further adjustment of derailleur 42 is performed, OP is reset to zero in Step S13, and the program returns to step S2. On the other hand, when SH is not equal to seven, rear derailleur 42 is operated to shift chain 7 to the sprocket 43 corresponding to the next higher speed step, the value of SH is incremented by one, the value of OP is decremented by one, and the process returns to step S2.

In summary, in this embodiment the rider can command a shift to a desired speed step by pushing the upshift buttons 18a, 18b or downshift buttons 19a, 19b of the shift command units 14a, 14b at any time. When the shift command unit 14a is operated during shifting of the rear transmission 9 or when the shift command unit 14b is operated during shifting of the front transmission 8, the transmission control unit 15 stores the information for the shift commands as OP count values in memory 22. More specifically, when the upshift buttons 18a, 18b are pushed, the OP counts are incremented, whereas when the downshift buttons 19a, 19b are pushed, the OP counts are decremented. When a plurality of shift commands are issued by the shift command units 14a, 14b, the OP count values are adjusted accordingly to produce resultant OP values. When the shifting action of the relevant front transmission 8 or rear transmission 9 is completed, the transmission control unit 15 conducts appropriate adjustment of front derailleur 33 and/or rear derailleur 42 based on the corresponding OP values at this point of time. Thus, the shift commands conducted by the rider during shifting are fully taken into account. Furthermore, when a plurality of shift commands are conducted during shifting, the gear change operations to the final speed step in this process can be conducted with a minimum action.

Figure 5:
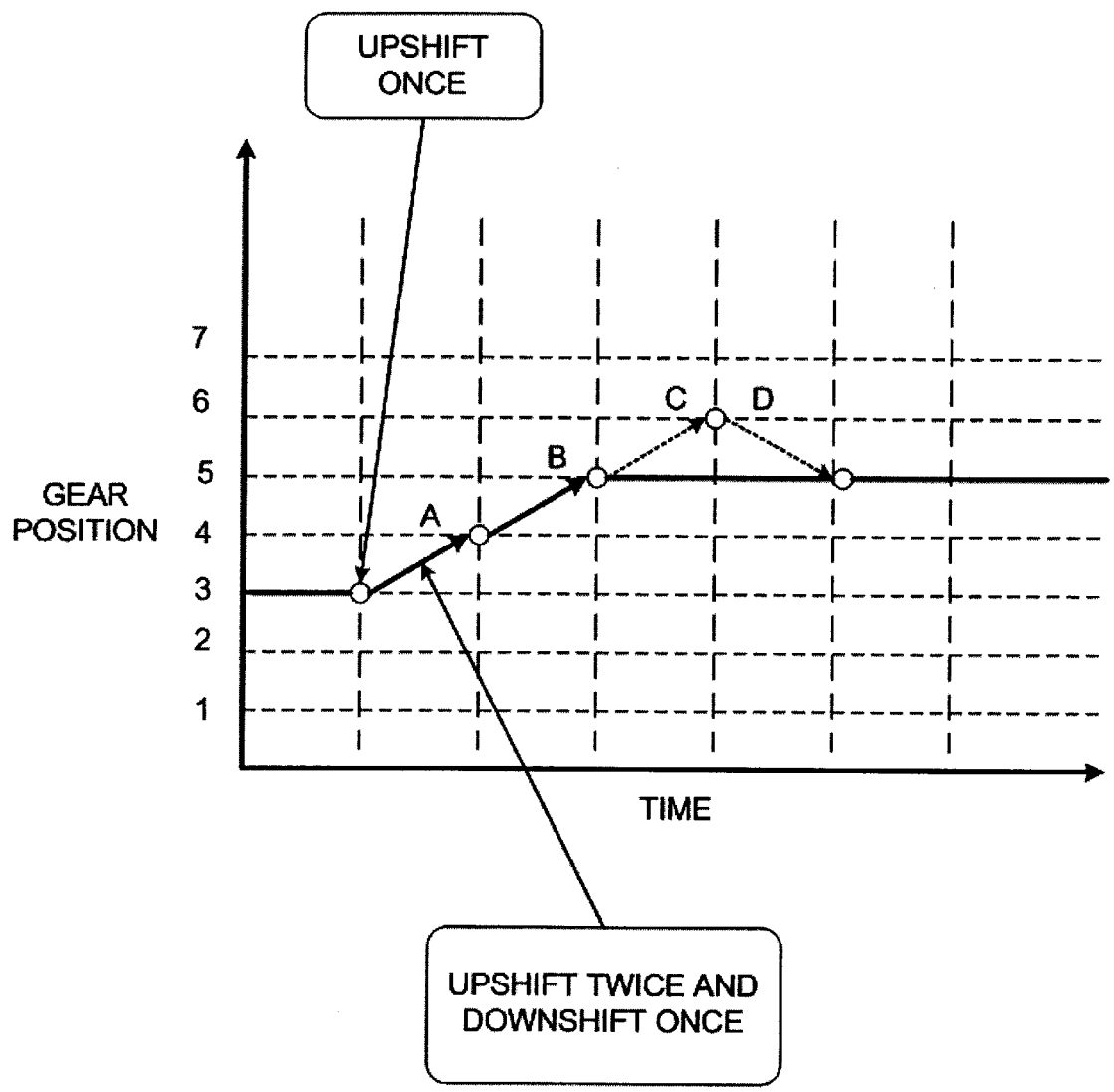
FIG. 5 is a graph illustrating an example of the difference in operation between the present control unit and a prior art control unit.

FIG. 5 is a graph illustrating an example of the difference in operation between the present transmission control unit 15 and a prior art control unit. Assume the rider twice pushes the rear upshift button 18a and then once pushes the rear downshift button 19a as the rear derailleur 42 is being upshifted from the third speed step to the fourth speed step. If all of the shift commands were carried out in sequence, upon completion of the shifting action A, a shifting action B would be carried out from the fourth speed step to the fifth speed step, a shifting action C would be carried out from the fifth speed step to the sixth speed step, and a shifting action D would be carried out from the sixth speed step to the fifth speed step. However, since the rider only wanted to shift to the fifth speed step, the shifting actions C and D were superfluous. In the present embodiment, the final speed step which results from issuing multiple shift commands is detected in advance, and the operation of the derailleur to that final speed step is conducted. In this example, only shifting action B is conducted after completing shifting action A.

It is clear that the burden on the transmission components is reduced, and shifting to the final target speed step can be conducted within a short time. Furthermore, because the front derailleur 33 and rear derailleur 42 are driven from a battery, the reduction in the number of operations by these components makes it possible to suppress the exhaustion of the battery due to gear change operations.

Figure 6:
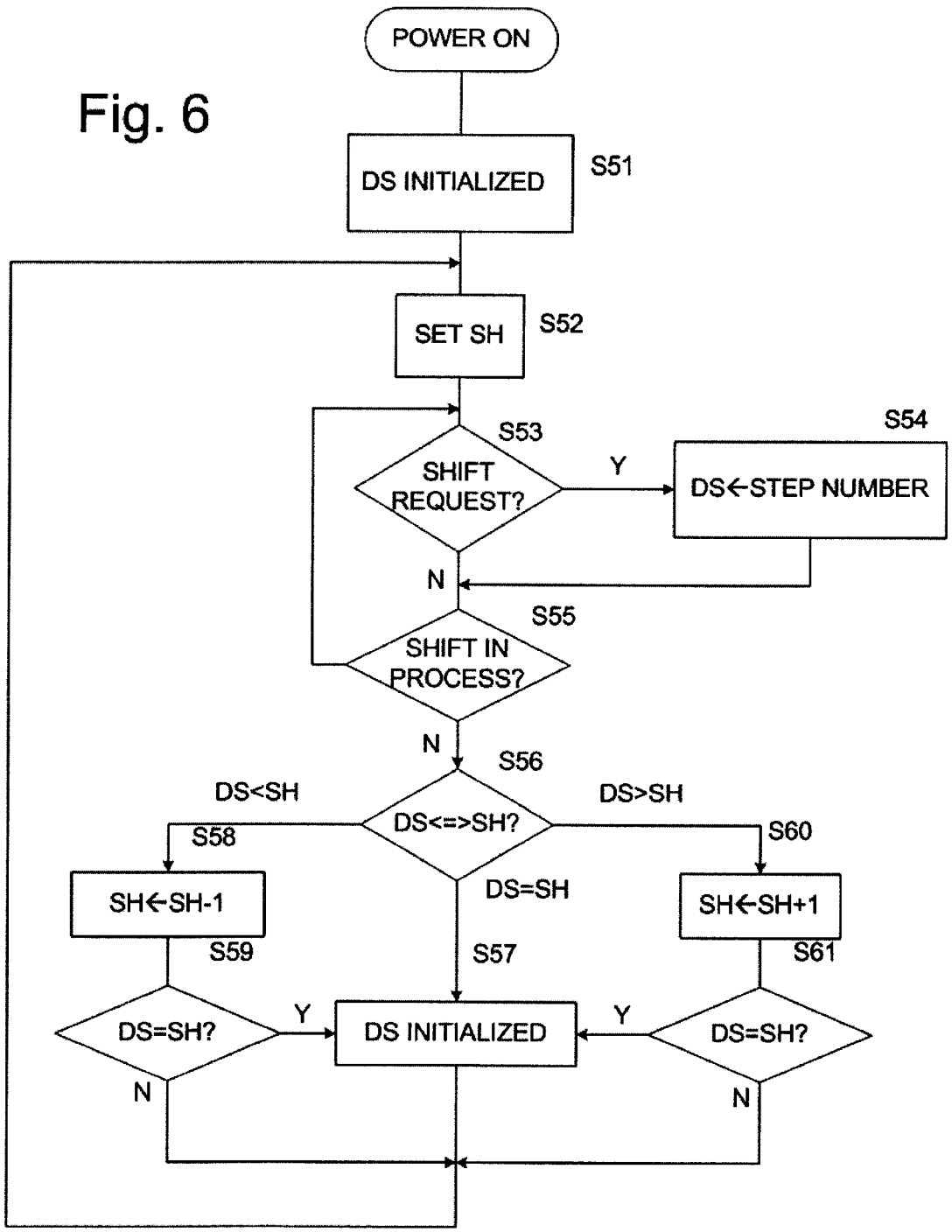
FIG. 6 is a flow chart of another embodiment of an algorithm used to control the rear transmission.

In the above-described embodiment, the shift commands issued by the rider were input using shift command units 14a, 14b that had upshift buttons 18a, 18b and downshift buttons 19a, 19b for upshifting and downshifting the front transmission 8 and rear transmission 9. However, the bicycle 1 also may have shift command units 14a, 14b comprising shift buttons that directly indicate the speed step number of the front transmission 8 and rear transmission 9. In such a case, when a shift button is pushed, the transmission control unit 15 moves front derailleur 33 and/or rear derailleur 42 to the desired speed stage. FIG. 6 is a flow chart of an embodiment of an algorithm used to control the rear transmission in such an arrangement. The front transmission 8 may be controlled in the same manner, except for the number of speed steps.

When the rider turns on the power switch S25, processing proceeds to Step S51. At that time, various control flags are set, and a direct step (DS) location in the memory 22 is set to a value corresponding to the current operating position of the shift button of the shift command unit 14a. Thus, in this embodiment, DS is set to one when the rider operates the shift button of the first speed step, and DS is set to three when the rider operates the shift button of the third speed step.

In step S52, the current position of rear derailleur 42 is obtained from the position sensor for rear derailleur 42 and stored in a location (SH) in memory 22. In step S53, a decision is made whether or not a shift button of shift command unit 14a has been pushed. If so, the program proceeds to step S54 wherein DS is set to the value of the shift button, and the program proceeds to step S55. On the other hand, if the shift button has not been pushed, then the program proceeds directly to step S55. In step S55, a decision is made by the derailleur position sensor or the like whether or not the rear derailleur 42 is being shifted. If rear derailleur 42 is presently being shifted, the program returns to step S53 to check whether or not the shift button has been pushed again. If so, then DS is set to the new value corresponding to the shift button.

If rear derailleur 42 is not being shifted (e.g., the rear derailleur 42 has completed a prior shifting operation), then the program proceeds to step S56. In step S56, a decision is made whether or not DS is equal to, less than, or greater than SH. If DS equals SH, then no change is necessary either because no shift command was issued or else the final shift command in a series of shift commands resulted in the request for the current speed step. In this case, the program proceeds to step S57 wherein DS is set to SH (which is a redundant action in this case) and then returns to step S52.

When DS is less than SH, the program proceeds to Step S58. In step S58, rear derailleur 42 shifts chain 7 to a sprocket 43 corresponding to one speed step less than the current speed step, SH is decremented, and the program proceeds to Step S59. In step S59 it is determined whether DS is equal to SH. If so, then the program proceeds to Step S57. Otherwise, the program proceeds to Step S52 wherein it can be determined whether a shift button has been pressed again.

When DS is greater than SH, the program proceeds to Step S60. In step S60, rear derailleur 42 shifts chain 7 to the sprocket 43 corresponding to one speed step higher than the current speed step, SH is incremented, and the program proceeds to Step S61. In step S61 it is determined whether DS is equal to SH. If so, then the program proceeds to Step S57. Otherwise, the program proceeds to Step S52 wherein it can be determined whether a shift button has been pressed again.

While the above is a description of various embodiments of inventive features, further modifications may be employed without departing from the spirit and scope of the present invention. For example, in the described embodiment the bicycle 1 had manually operated front and rear transmissions, and the rider operated the front and rear transmissions 8 and 9 using the shift command units 14a and 14b. However, the bicycle 1 may have a configuration in which the transmission control unit 15 automatically shifts the transmissions according to the speed of bicycle 1 in an automatic mode of operation, and mode switch 26 can be used to switch from automatic to manual modes of operation. In the automatic shifting mode, the speed of bicycle 1 may be detected from a speed sensor that detects the rotation of front wheel 5 or rear wheel 6, and the transmission control unit 15 may conduct automatic shifting according to the bicycle speed. The transmission control unit 15 downshifts when the speed is low and upshifts up when the speed is high.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for controlling the operation of a bicycle transmission comprising:

a shift command receiving unit that receives shift command signals corresponding to shift commands; and a shift command combining unit that combines a plurality of independent shift command signals into a resultant shift command signal that would shift the bicycle transmission to the same state as if a corresponding plurality of independent shift commands all were executed individually.

2. The apparatus according to claim 1 wherein the shift command signals include an upshift signal for shifting the bicycle transmission to a higher speed step and a downshift signal for shifting the bicycle transmission to a lower speed step.

3. The apparatus according to claim 1 wherein the shift command signals include speed step signals for shifting the bicycle transmission to a specific speed step.

4. The apparatus according to claim 1 wherein the shift command combining unit combines the plurality of shift command signals received during a prescribed interval.

5. The apparatus according to 1 further comprising a transmission operating unit that operates the bicycle transmission in response to the shift commands.

6. The apparatus according to claim 5 wherein the shift command combining unit combines the plurality of shift command signals received during a prescribed interval.

7. The apparatus according to claim 6 wherein the shift command combining unit combines the plurality of shift command signals received while the transmission operating unit shifts the bicycle transmission from one speed step to another speed step.

8. The apparatus according to claim 7 the shift command signals include an upshift signal for shifting the bicycle transmission to a higher speed step and a downshift signal for shifting the bicycle transmission to a lower speed step.

9. The apparatus according to claim 8 further comprising a manually operated shift command unit for providing the shift command signals to the shift command receiving unit.

10. The apparatus according to claim 7 the shift command signals include speed step signals for shifting the bicycle transmission to a specific speed step.

11. A method for controlling the operation of a bicycle transmission comprising the steps of:

receiving shift command signals corresponding to shift commands; and combining a plurality of independent shift command signals into a resultant shift command signal that would shift the bicycle transmission to the same state as if a plurality of corresponding independent shift commands all were executed individually.

12. The method according to claim 11 the shift command signals include an upshift signal for shifting the bicycle transmission to a higher speed step and a downshift signal for shifting the bicycle transmission to a lower speed step.

13. The method according to claim 11 the shift command signals include speed step signals for shifting the bicycle transmission to a specific speed step.

14. The method according to claim 11 the combining step comprises the step of combining the plurality of shift command signals received during a prescribed interval.

15. The method according to claim 11 further comprising the step of shifting the bicycle transmission in response to the shift commands.

16. The method according to claim 15 the combining step comprises the step of combining the plurality of shift command signals received during a prescribed interval.

17. The method according to claim 16 the combining step comprises the step of combining the plurality of shift command signals received while the bicycle transmission shifts from one speed step to another speed step.

18. The method according to claim 17 the shift command signals include an upshift signal for shifting the bicycle transmission to a higher speed step and a downshift signal for shifting the bicycle transmission to a lower speed step.

19. The method according to claim 18 wherein the receiving step comprises the step of receiving the shift command signals from a manually operated shift command unit.

20. The method according to claim 17 the shift command signals include speed step signals for shifting the bicycle transmission to a specific speed step.

* * * * *